United States Patent
Wang et al.

(10) Patent No.: US 6,798,652 B2
(45) Date of Patent: Sep. 28, 2004

(54) MOUNTING APPARATUS FOR DATA STORAGE DEVICE

(75) Inventors: Liang-Chin Wang, Tu-chen (TW); Jian Hu, Shenzhen (CN)

(73) Assignee: Hon Hai Precision Ind. Co., LTD, Taipei Hsien (TW)

(*) Notice: Subject to any disclaimer, the term of this patent is extended or adjusted under 35 U.S.C. 154(b) by 33 days.

(21) Appl. No.: 10/318,887

(22) Filed: Dec. 13, 2002

(65) Prior Publication Data

US 2004/0105229 A1 Jun. 3, 2004

(30) Foreign Application Priority Data

Nov. 29, 2002 (TW) ..................................... 91219306 U

(51) Int. Cl.[7] ............................ H05K 7/16; A47B 81/00
(52) U.S. Cl. ....................... 361/685; 361/686; 361/726; 312/223.1
(58) Field of Search ................................ 361/683, 685, 361/687, 686, 724–727; 312/223.1, 223.2, 223.3; 364/705.01, 708.01; 360/97.01, 98.01, 137 D, 900; 248/346, 672, 581

(56) References Cited

U.S. PATENT DOCUMENTS

| | | | | |
|---|---|---|---|---|
| 5,187,643 A | * | 2/1993 | I-Shou | 361/685 |
| 5,216,582 A | * | 6/1993 | Russell et al. | 361/685 |
| 5,768,099 A | * | 6/1998 | Radloff et al. | 361/685 |
| 6,141,222 A | * | 10/2000 | Toor et al. | 361/726 |

* cited by examiner

*Primary Examiner*—Michael Datskovsky
(74) *Attorney, Agent, or Firm*—Wei Te Chung

(57) ABSTRACT

A data storage device mounting apparatus includes a drive bracket (10) and a cover (20). The device bracket includes a first side plate (14) and a second side plate (16). The first side plate defines two engaging slots (140), and includes two positioning pins (144) engaging in positioning holes (32) of one side of a data storage device (30). The second side plate includes three locating flanges (160), and defines two locating holes (164). The cover includes a first edge portion (24) and a second edge portion (26). The first edge portion includes two engaging latches (240) engaging in the engaging slots respectively. The second edge portion includes three tabs defining three locating slots (262) engagingly receiving the locating flanges, and two locating posts (264) extending through the locating holes and engaging in positioning holes (32) of an opposite side of the data storage device.

17 Claims, 3 Drawing Sheets

US 6,798,652 B2

MOUNTING APPARATUS FOR DATA STORAGE DEVICE

BACKGROUND OF THE INVENTION

1. Field of the Invention

The present invention relates to a computer enclosure, and particularly to a computer enclosure having a mounting apparatus for readily attaching a data storage device in the enclosure.

2. Related Art

A typical personal computer comprises data storage devices such as a hard disk drive (HDD), a floppy disk drive and a compact disc-read only memory (CD-ROM) drive. Conventionally, the data storage devices are attached to a chassis of a computer enclosure using screws. A tool such as screwdriver is required to fasten the screws, and to unfasten the screws when removing the data storage devices. These fastening and unfastening operations are laborious and time-consuming. Furthermore, even careful operators may cause the tool to slip, or may drop screws. When this happens, other internal components of the computer are liable to be damaged.

Various solutions have been devised to overcome the problems inherent in screw-type drive attachment means. One popular solution is to attach slide rails to opposite sides of the data storage device, and incorporate complementary guiding rails in the computer chassis. Said rails allow the computer drive to be slid into the chassis and then locked in place. Typical examples of this solution are disclosed in U.S. Pat. Nos. 5,806,949, 5,801,920, 5,734,557, 5,599,080, 5,595,501 and 5,262,923, and in Taiwan Patent Applications Nos. 79209891, 81207129, 82202204 and 82207667. However, none of these solutions eliminates the need for screws, because screws are still required to attach the slide rails to the data storage device.

Thus an improved mounting apparatus for data storage devices which overcomes the above-mentioned problems is desired.

SUMMARY OF THE INVENTION

Accordingly, an object of the present invention is to provide a mounting apparatus for easy and convenient installation or removal of data storage devices into or from a computer enclosure without screws.

To achieve the above object, a data storage device mounting apparatus in accordance with a preferred embodiment of the present invention includes a drive bracket mounted to a chassis of a computer, and a cover for attaching to the drive bracket. The drive bracket comprises a bottom plate, a first side plate, and an opposite second side plate. The first side plate defines a pair of engaging slots in a top portion thereof, and comprises a pair of positioning pins engaging in positioning holes of one side of a data storage device. The second side plate comprises three evenly spaced locating flanges extending perpendicularly therefrom, and defines a plurality of locating holes. The cover comprises a main body having a first edge portion and an opposite second edge portion. The first edge portion of the main body comprises a pair of engaging latches defining a wedge-shaped catch at a free end thereof. The engaging latches are for engaging in the engaging slots of the first side plate of the drive bracket respectively. The second edge portion of the main body comprises three evenly spaced tabs depend from a free edge thereof. Each tab defines a locating slot for receiving one corresponding locating flange of the second side plate. Two endmost of the tabs inwardly form a pair of locating posts extending through the locating holes of the drive bracket and engaging in positioning holes of an opposite side of the data storage device. The first and second side plates of the drive bracket comprise a plurality of first tongues urging said sides of the data storage device. The data storage device is supported on the bottom plate of the drive bracket. The main body of the cover comprises a plurality of second tongues urging a top of the data storage device. The data storage device is thereby securely retained in the mounting apparatus.

Other objects, advantages and novel features of the present invention will be drawn from the following detailed description of preferred embodiments of the present invention with the attached drawings, in which:

DESCRIPTION OF THE PREFERRED EMBODIMENT

The present invention will be described in its preferred embodiment, and in conjunction with a data storage device such as an HDD.

Figure 1:
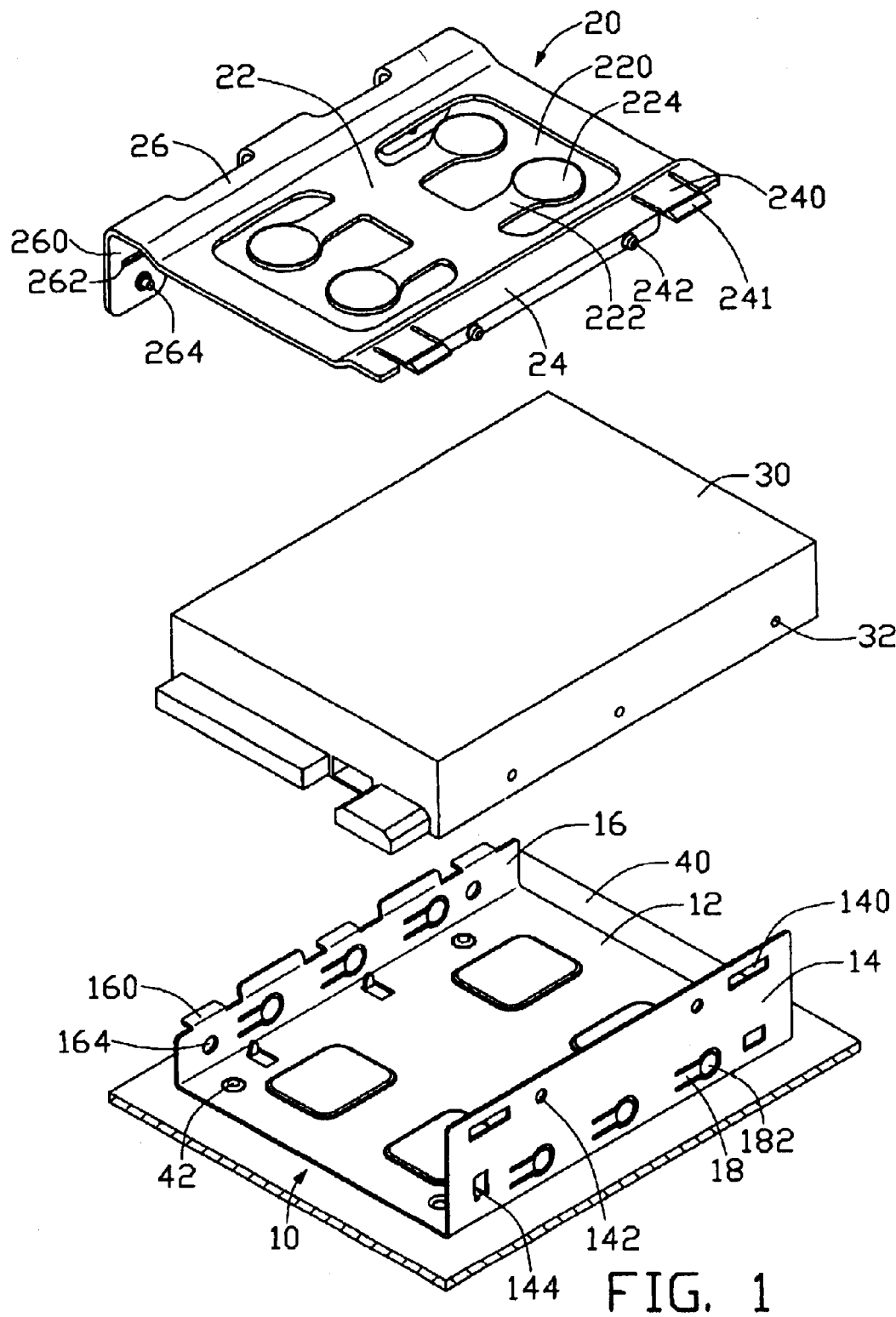
FIG. 1 is an exploded isometric view of a data storage device mounting apparatus in accordance with a preferred embodiment of the present invention, together with a data storage device.
Figure 2:
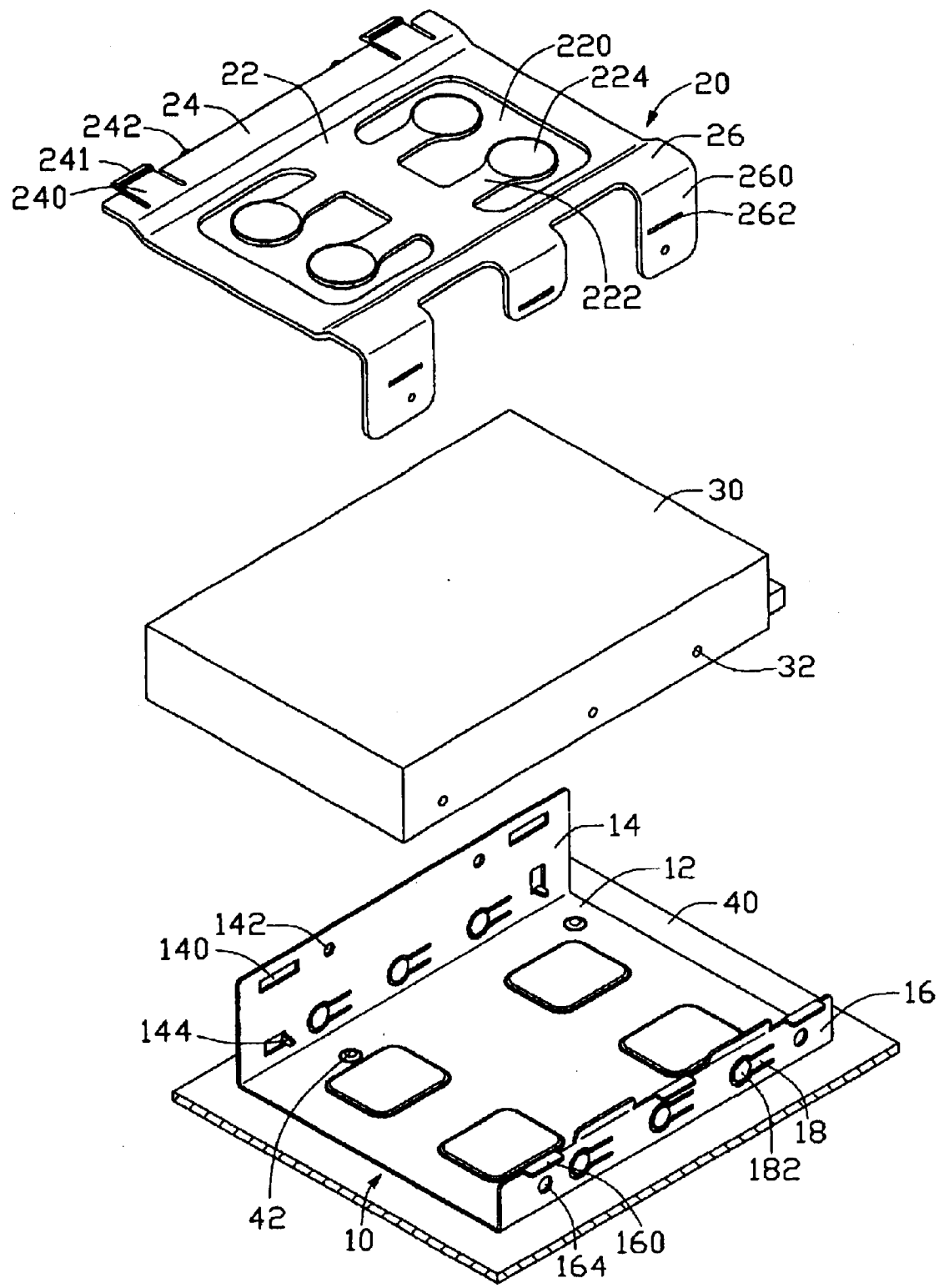
FIG. 2 is similar to FIG. 1, but viewed from another aspect.

FIGS. 1 and 2 show a data storage device mounting apparatus in accordance with the preferred embodiment of the present invention, together with a data storage device 30. The mounting apparatus includes a drive bracket 10 attached to a chassis 40 of a computer (not shown), and a cover 20 attached to the drive bracket 10.

The data storage device 30 defines a plurality of positioning holes 32 in each of opposite sides thereof.

The drive bracket 10 is made of metallic material, and is mounted to the chassis 40 with a plurality of rivets 42. The drive bracket 10 comprises a bottom plate 12, and a first side plate 14 and a second side plate 16 extending upwardly from opposite edges of the bottom plate 12 respectively. The bottom plate 12 and first and second side plates 14, 16 cooperatively define a space (not labeled) therebetween for receiving the data storage device 30 therein.

A pair of horizontal engaging slots 140 is defined near opposite ends of a top portion of the first side plate 14 respectively. A pair of fixing holes 142 is defined adjacent the engaging slots 140 respectively, being located between the engaging slots 140. The fixing holes 142 and the engaging slots 140 are substantially at a same level. A pair of positioning pins 144 extends inwardly from near opposite ends of a bottom portion of the first side plate 14 respectively. The positioning pins 144 are for engaging in a corresponding pair of the positioning holes 32 of one side of the data storage device 30.

The second side plate 16 defines a pair of fixing holes 164 generally opposite from the positioning pins 144 of the first side plate 14. Three evenly spaced locating flanges 160 extend perpendicularly outwardly from a top edge of the second side plate 16.

Each of the first and second side plates 14, 16 comprises a plurality of aligned first tongues 18. Each first tongue 18 comprises an urging portion 182 at a free end thereof. Each urging portion 182 has a convex face that projects beyond an inner face of the respective first or second side plate 14, 16. The urging portions 182 are used to urge the opposite sides of the data storage device 30.

The cover 20 is made of resilient material such as plastic. The cover 20 comprises a main body 22 having a slightly raised first edge portion 24, and an opposite slightly raised second edge portion 26. A pair of openings 220 is defined in the main body 22. A pair of second tongues 222 extends from a transverse central portion of the main body 22 into each of the openings 220. Each second tongue 222 comprises an urging portion 224 at a free end thereof. The urging portion 224 has a convex face that projects beyond a bottom face of the main body 22. The urging portions 224 are used to urge a top of the data storage device 30.

A pair of engaging latches 240 extends coplanarly outwardly from near opposite ends respectively of the first edge portion 24 of the main body 22. Each engaging latch 240 has a wedge-shaped catch 241 upwardly formed at a free end thereof. The engaging latches 240 are for engaging in the engaging slots 140 of the drive bracket 10. A pair of fixing posts 242 is outwardly formed adjacent the corresponding engaging latches 240 respectively, and being located between the engaging latches 240. The fixing posts 242 are for being received in the fixing holes 142 of the drive bracket 10.

Three evenly spaced tabs 260 depend from a free edge of the second edge portion 26 of the main body 22. Each tab 260 defines a locating slot 262 for receiving one corresponding locating flange 160 of the drive bracket 10. The locating slots 262 arc disposed at a same level. Two endmost of the tabs 260 are longer than a central one of the tabs 260. Each endmost tab 260 inwardly forms a locating post 264, below the respective locating slot 262. The locating posts 264 are for extension through the fixing holes 164 of the drive bracket 10 and engagement in a corresponding pair of positioning holes 32 of an opposite side of the data storage device 30.

Figure 3:
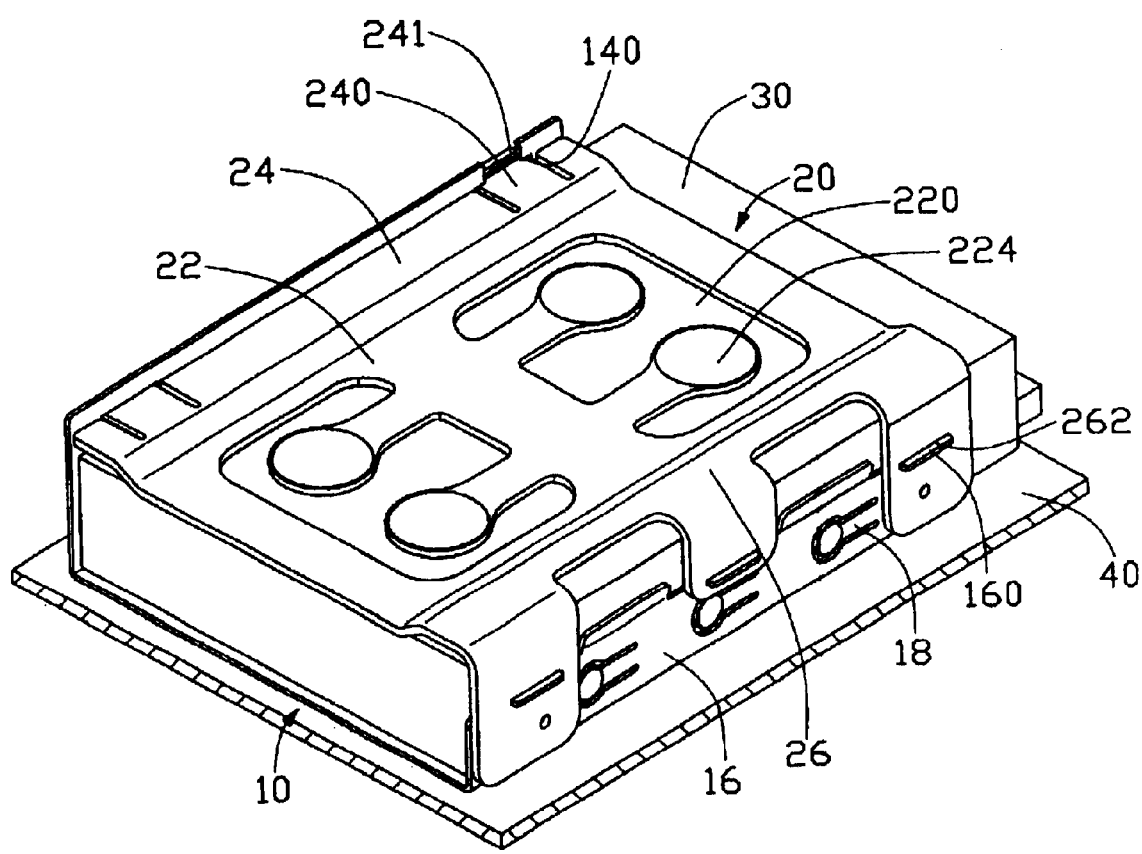
FIG. 3 is an assembled view of FIG. 1, showing the data storage device installed in the mounting apparatus.

Referring to FIG. 3, in assembly, the data storage device 30 is disposed in the space between the bottom plate 12 and the first and second side plates 14, 16 of the drive bracket 10. The positioning pins 144 of the first side plate 14 are engaged in the corresponding positioning holes 32 of said one side of the data storage device 30. The data storage device 30 is thus supported on the bottom plate 12. The urging portions 182 of the first tongues 18 of the first and second side plates 14, 16 urge against the opposite sides of the data storage device 30. The fixing holes 164 of the second side plate 16 are aligned with the corresponding positioning holes 32 of the said opposite side of the data storage device 30.

Then the second edge portion 26 of the cover 20 is covered on the second side plate 16 of the drive bracket 10 from above. The second edge portion 26 is pressed downwardly, so that the tabs 260 are aligned with the corresponding locating flanges 160 of the drive bracket 10. The locating flanges 160 are received in the locating slots 262 of the tabs 260. At the same time, the locating posts 264 of the endmost tabs 260 of the second side plate 16 are extended through the fixing holes 164 of the second side plate 16 and engaged in the corresponding positioning holes 32 of said opposite side of the data storage device 30. The second edge portion 26 of the cover 20 is thereby secured to the second side plate 16 of the drive bracket 10.

Finally, the first edge portion 24 of the cover 20 is placed adjacent the first side plate 14 of the drive bracket 10. The engaging latches 240 of the first edge portion 24 are aligned with the engaging slots 140 of the first side plate 14, and the fixing posts 242 of the first edge portion 24 are aligned with the fixing holes 142 of the first side plate 14. The first side plate 14 is resiliently deformed slightly outwardly, and the engaging latches 240 are extended through the engaging slots 140 of the first side plate 14 until the wedge-shaped catches 241 of the engaging latches 240 are snappingly engaged at an outside face of the first side plate 14. At the same time, the fixing posts 242 of the cover 20 extend through the corresponding fixing holes 142 of the first side plate 14. The first edge portion 24 of the cover 20 is thereby connected to the first side plate 14 of the drive bracket 10. Thus assembly of the data storage device 30 in the data storage device mounting apparatus is completed.

To remove the data storage device 30, the wedge-shaped catches 241 are pressed downwardly and inwardly, and the first side plate 14 of the drive bracket 10 is resiliently deformed slightly outwardly so that the engaging latches 240 of the cover 20 disengage from the engaging slots 140 of the first side plate 14. At the same time, the fixing posts 242 of the cover 20 exit the fixing holes 142 of the first side plate 14. The cover 20 is then pulled slightly upwardly and away from the first side plate 14 of the drive bracket 10. The endmost tabs 260 are pulled outwardly and upwardly so that the locating posts 264 disengage from the positioning holes 32 of the data storage device 30 and from the fixing holes 164 of the second side plate 16 of the drive bracket 10. At the same time, the locating flanges 160 of the drive bracket 10 exit the locating slots 262 of the cover 20. The cover 20 is then pulled away from the second side plate 16 of the drive bracket 10. Finally, said opposite side of the data storage device 30 that abuts the second side plate 16 is lifted up and out of the drive bracket 10, so that the data storage device 30 is released from the positioning pins 144 of the first side plate 14.

In the mounting apparatus of the present invention, the positioning pins 144 of the drive bracket 10 and the locating posts 264 of the cover 20 are extended into the respective positioning holes 32 of the data storage device 30. Thus, the data storage device 30 is prevented from moving relative to the drive bracket 10 along a first axis, the first axis being parallel to the bottom plate 12 and the first and second side plates 14, 16 of drive bracket 10. In addition, the first tongues 18 of the drive bracket 10 urge against the opposite sides of the data storage device 30. Thus, the data storage device 30 is prevented from moving relative to the drive bracket 10 along a second axis that is perpendicular to the first axis and parallel to the bottom plate 12. Furthermore, the data storage device 30 is supported on the bottom plate 12, and the second tongues 222 of the cover 20 urge against the top of the data storage device 30. Thus, the data storage device 30 is prevented from moving relative to the drive bracket 10 along a third axis that is perpendicular to both the first and second axes.

In addition, the cover 20 is snappingly attached to the drive bracket 10, allowing the data storage device 30 to be secured in the mounting apparatus without screws. Installation and removal the data storage device 30 is convenient and quick. Moreover, the first tongues 18 urging against the data storage device 30 provide reliable grounding paths for the data storage device 30.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A mounting apparatus adapted to mount a data storage device in a computer enclosure, comprising:

a drive bracket for mounting to the computer enclosure and adapted for receiving the data storage device, the drive bracket comprising a first side plate and a second side plate, the first side plate defining at least one engaging slot, the second side plate comprising at least one locating flange; and a cover adapted for securing the data storage device in the drive bracket, the cover comprising a first edge portion connected to the first side plate and a second edge portion connected to the second side plate, the first edge portion comprising at least one engaging latch engaging in the at least one engaging slot of the drive bracket, and the second edge portion defines at least one locating slot engagingly receiving the at least one locating flange of the drive bracket.

2. The mounting apparatus as described in claim 1, wherein the first side plate of the drive bracket defines a pair of engaging slots near opposite ends of a top portion thereof, the first edge portion of the cover comprises a pair of engaging latches, and each of the engaging latches comprises a catch at a free end thereof.

3. The mounting apparatus as described in claim 2, wherein a pair of fixing holes is defined in the first side plate respectively adjacent the engaging slots, and a pair of fixing posts is formed adjacent the engaging latches of the first edge portion for being received in the fixing holes.

4. The mounting apparatus as described in claim 1, wherein the second edge portion of the cover comprises three tabs depending from a free edge thereof, and the second edge portion defines three locating slots in the tabs respectively.

5. The mounting apparatus as described in claim 4, wherein two endmost of the tabs are longer than a central one of the tabs, each of the endmost tabs inwardly forms a locating post below the locating slot, and the second side plate of the drive bracket defines a pair of locating holes for extension of the locating posts therethrough to engage with the data storage device.

6. The mounting apparatus as described in claim 1, wherein a pair of spaced positioning pins extends inwardly from the first side plate for engaging with the data storage device.

7. The mounting apparatus as described in claim 1, wherein the first and second side plates of the drive bracket comprise a plurality of first tongues, and each of the first tongues comprises a convex urging portion adapted for urging sides of the data storage device.

8. The mounting apparatus as described in claim 1, wherein the cover comprises a main body including the first edge portion and the second edge portion, the main body comprises a plurality of second tongues, and each of the second tongues comprises a convex urging portion adapted for urging a top of the data storage device.

9. A mounting apparatus assembly comprising:
a data storage device defining a plurality of positioning holes in each of opposite sides thereof;
a drive bracket receiving the data storage device therein, the drive bracket comprising a first side plate and a second side plate, the first side plate defining at least one engaging slot and comprising a plurality of positioning pins engaging in corresponding positioning holes of one side of the data storage device, the second side plate comprising at least one locating flange and defining a plurality of locating holes; and
a cover attached on the drive bracket and securing the data storage device in the drive bracket, the cover comprising:
a main body urging a top of the data storage device;
at least one engaging latch engaging in the at least one engaging slot of the drive bracket;
at least one locating slot engagingly receiving the at least one locating flange of the drive bracket; and
a plurality of locating posts extending though the locating holes of the drive bracket to engage in corresponding positioning holes of an opposite side of the data storage device.

10. The mounting apparatus as described in claim 9, wherein the first and second side plates of the drive bracket comprise a plurality of first tongues, and each of the first tongues comprises a convex urging portion adapted for urging the sides of the data storage device.

11. The mounting apparatus as described in claim 9, wherein the main body of the cover comprises a plurality of second tongues, and each of the second tongues comprises a convex urging portion adapted for urging a top of the data storage device.

12. The mounting apparatus as described in claim 9, wherein the main body of the cover comprises a first edge portion connected to the first side plate of the drive bracket, and a second edge portion connected to the second side plate of the drive bracket.

13. The mounting apparatus as described in claim 12, wherein the first side plate of the drive bracket defines a pair of engaging slots near opposite ends of a top portion thereof, the first edge portion of the cover comprises a pair of engaging latches, and each of the engaging latches comprises a catch at a free end thereof.

14. The mounting apparatus as described in claim 13, wherein a pair of fixing holes is defined in the first side plate respectively adjacent the engaging slots, and a pair of fixing posts is formed adjacent the engaging latches of the first edge portion for being received in the fixing holes.

15. The mounting apparatus as described in claim 9, wherein the second edge portion of the cover comprises three tabs depending from a free edge thereof, and the cover comprises three locating slots defined in the tabs respectively.

16. The mounting apparatus as described in claim 15, wherein two endmost of the tabs are longer than a central one of the tabs, the cover comprises a pair of locating posts inwardly formed from the endmost tabs respectively below corresponding locating slots, and the second side plate of the drive bracket defines a pair of locating holes.

17. A data storage assembly comprising:
a data storage device with a plurality of holes communicating with an exterior;
a drive bracket cooperating with a cover to define a space snugly receiving said data storage device therein, said bracket and said cover essentially defining upper and lower positions relative to each other along a first direction,
said bracket including in said first direction a bottom plate being permanently attached to a chassis, and opposite first and second side plates in a second direction perpendicular to said first direction;
a plurality of positioning tabs formed on at least one of said bottom plate and said side plates, and inserted into the corresponding holes, respectively, for preventing the data storage device from moving relative to the bracket in any directions; and
means formed on the cover and the bracket for assembling said bracket and said cover in said second direction, and preventing disassembling in directions perpendicular to said second direction; wherein
latch means formed on at least one of said cover and said bracket, prevents the cover from moving away from the bracket in a third direction opposite to said second direction.

* * * * *